United States Patent [19]

Boilot et al.

[11] Patent Number: 5,545,427

[45] Date of Patent: Aug. 13, 1996

[54] PROCESS FOR THE PREPARATION OF LITHIUM ALUMINOSILICATE OR GAMMA LITHIUM ALUMINATE CERAMICS HAVING A CONTROLLED STOICHIOMETRY AND MICROSTRUCTURE

[75] Inventors: Jean-Pierre Boilot, Meudon La Foret; Marcel Boncoeur, Paris; Bernard Rasneur, Le Mesnil St Denis; Olivier Renoult, Allonnes, all of France

[73] Assignee: Commissariat A L'Energie Atomique, Paris, France

[21] Appl. No.: 398,813

[22] Filed: Mar. 6, 1995

Related U.S. Application Data

[63] Continuation of Ser. No. 9,792, Jan. 27, 1993, abandoned.

[30] Foreign Application Priority Data

Feb. 7, 1992 [FR] France ................................. 92 01394

[51] Int. Cl.⁶ .................................................... G21C 3/06
[52] U.S. Cl. ................................. 427/6; 264/0.5; 264/65; 501/7; 501/12
[58] Field of Search ............................... 427/5, 6; 501/7, 501/12; 264/0.5, 65

[56] References Cited

U.S. PATENT DOCUMENTS 4,030,903  6/1977  Rittler ..................................... 501/2 X
4,851,373  7/1989  Hench et al. ............................ 501/12

OTHER PUBLICATIONS

Yoldas, B. E. "Preparation of glasses and ceramics from metal-organic compounds," Journal of Materials Science 12, (1977), pp. 1203–1208.

Kinoshita, K et al., "Preparation and Characterization of Lithium Aluminate," Mat. Res. Bull. vol. 13, pp. 445–455, 1978.

Hirano, Shin–Ichi et al, " Synthesis of $LiAlo_2$ Powder by Hydrolysis of Metal Alkoxides," J. Am. Ceram Soc., vol. 70, 1987, pp. 171–174.

Turner, Carl W. et al, "The Preparation of Lithium Aluminate by the Hydrolysis of Lithium and Aluminum Alkoxides," Advances in Ceramics, vol. 25, 1989, pp. 141–147.

Kinoshita et al, In Mat. Res. Bull, vol. 13, pp. 445–455, 1978

Rasneur, In Advances in Cermics, vol 27, 1990, pp. 63–76.

Rasneur, Bernard., "Fabrication of Large $LiAlO_2$ Pellets, and Properties of $LiAlO_2$ $Li_2ZrO_3$ as Tritium Breeders for a Solid Blanket," Advanced Ceramics, vol. 27, 1990 pp. 63–76.

Alvani, Carlo et al, "Ceramics Process Versus Property Optimization of Lithium Aluminate as Tritium Breeding Material," pp. 1–8, No data.

Primary Examiner—Michael Lusignan
Attorney, Agent, or Firm—Pearne, Gordon, McCoy & Granger

[57] ABSTRACT

This invention relates to a process for the preparation of lithium aluminosilicate or gamma lithium aluminate ceramics having a controlled microstructure and stoichiometry.

According to this process, mixing takes place accompanied by stirring in a short chain anhydrous alcohol of an unpolymerized liquid aluminium alkoxide and optionally a silicon alkoxide with a hydrated or unhydrated lithium hydroxide, followed by the addition of water in order to hydrolyze the mixture and obtain, after drying, beta $LiAlO_2$ powder.

This powder can be directly compacted and then sintered at temperatures of 800° to 1150° C. without prior calcination giving a gamma lithium aluminate ceramic with a controlled stoichiometry and microstructure (grains of 0.1 to 10 μm).

18 Claims, No Drawings

PROCESS FOR THE PREPARATION OF LITHIUM ALUMINOSILICATE OR GAMMA LITHIUM ALUMINATE CERAMICS HAVING A CONTROLLED STOICHIOMETRY AND MICROSTRUCTURE

This is a continuation of application Ser. No. 08/009,792 filed Jan. 27, 1993, now abandoned.

The present invention relates to a process for the preparation of lithium aluminosilicate or gamma lithium aluminate ceramics, which are isostructural compounds of gamma lithium aluminate more particularly usable as a tritium-producing covering material for controlled thermonuclear fusion reactors.

It is known that ceramics based on lithium oxide and in particular gamma lithium aluminate and its isostructural compounds are good candidates as tritium-producing covering material for nuclear fusion reactors. However, for such applications it is important to control the microstructure (grain size and porosity) of the ceramic in order to be able to then control the release kinetics of the tritium formed under neutron irradiation from the covering material.

The known processes for preparing gamma lithium aluminate either use reactions in the solid state based on gamma aluminate, or liquid phase reactions, e.g. aluminium and lithium alkoxide hydrolysis reactions.

Solid phase preparation reactions using alumina and lithium compounds such as lithium hydroxide or carbonate have e.g. been described by Kinoshita et al in Mat. Res. Bull., vol. 13, pp 445–455, 1978.

These preparation procedures are not complicated, but generally suffer from the disadvantage of requiring complimentary crushing and sintering stages for the $LiAlO_2$ powder. Moreover, as described by Bernard Rasneur in Advances in Ceramics, vol. 27, 1990, pp 63–76, the density obtained after sintering remains low and the microstructure of the material is dependent on the stoichiometry.

In addition, liquid phase preparation processes have been developed and in particular those of the sol-gel type, which make it possible to prepare beta or gamma lithium aluminate powder by hydrolysis of lithium and aluminium alkoxides or alcoholates, followed by calcination. Processes of this type are e.g. described by Turner et al in Advances in Ceramics, vol. 25, 1989, pp 141–147.

In order to carry out said hydrolysis, it is possible to use different lithium and aluminium alkoxides in an alcohol, but the hydrolysis reaction generally takes place with the alkoxide in the dispersed phase, because most lithium and aluminium alkoxides are solid and not very soluble in alcohols. However, it is possible to use secondary aluminium butoxide, which is liquid at ambient temperature and react it with a lithium hydroxide solution.

However, with these hydrolysis processes, it is necessary to then convert the amorphous or slightly crystalline powder in the beta $LiAlO_2$ into sintered gamma lithium aluminate. This can be carried out by a heat treatment, but the weight losses during the latter are approximately 40%, which implies the prior calcination of the powder before the actual sintering in order to prevent shrinkage and bursting problems during sintering.

In addition, in the case where use is made of secondary aluminium butoxide, the authors indicate that the latter can only be diluted in secondary butanol in order to avoid prejudicial fast exchanges between another alcohol and said alkoxide.

Hydrolysis can also take place on the basis of a mixture of lithium and aluminium alkoxides as described by Hirano et al, J. Am. Ceram. Soc., vol. 70, 1987, pp 171–174. In this case use is made of a mixture of lithium and aluminium ethoxides in ethanol with a concentration of 0.1 mole/l for each alkoxide, followed by hydrolysis by the addition of decarbonated distilled water. After hydrolysis, the precipitate is refluxed for 24 hours, then cooled and subjected to ultrafiltration under a nitrogen pressure of 500 kPa before being microwave dried. The powder obtained, which is beta lithium aluminate, then undergoes calcination at 750° C. for conversion into gamma lithium aluminate and the weight loss recorded during the heat treatment is approximately 20%. Thus, this calcination stage must be carried out prior to the compression and final sintering of the powder at a temperature of 1000° to 1450° C. and under oxygen.

The known processes consequently suffer from the disadvantage of requiring either a high temperature crushing and sintering stage, or a calcination stage followed by pressing and sintering stages, which does not make it possible to accurately control the microstructure (density, grain size) and stoichiometry of the gamma lithium aluminate ceramics obtained.

The present invention specifically relates to a process for the preparation of ceramics of gamma lithium aluminate or its isostructural compounds making it possible to obviate the disadvantages of the known processes.

According to the invention, the process for the preparation of lithium aluminosilicate or aluminate ceramics of formula

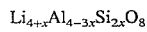

$$Li_{4+x}Al_{4-3x}Si_{2x}O_8$$

with $0 \leq x < 0.28$, comprises the following stages:
a) mixing in a short chain anhydrous alcohol a liquid, unpolarized aluminium alkoxide and, in the case where x is different from 0, a silicon alkoxide, with a hydrated or unhydrated lithium hydroxide,
b) adding water to the mixture obtained in stage a) in order to hydrolyze it,
c) drying at a temperature below 300° C. the hydrolyzed product obtained in stage b) in order to evaporate the alcohols and water and obtain a crystalline powder with a structure identical to that of beta $LiAlO_2$,
d) shaping the powder obtained in stage c) by isostatic or non-isostatic cold pressing, by pouring a slop, by spinning or by extruding and
e) subjecting the shaped powder to a thermal sintering treatment at a temperature of 800° to 1200° C. in order to obtain a sintered aluminosilicate or gamma lithium aluminate ceramic.

In this process, through the use as the starting alkoxide of an unpolymerized liquid alkoxide and through the performance of the reaction in the presence of a short chain anhydrous alcohol, it is possible to obtain a high hydrolyze reactivity favouring the formation by hydrolysis of well crystallized gamma or beta lithium aluminate.

Thus, aluminium alkoxides Al(OR)$_3$ and in particular those in which R is a lower alkyl group such as methyl, ethyl or propyl, have a marked tendency to polymerize in order to form alkoxy-type, stable molecular associations:

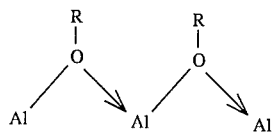

Therefore, these polymerized alkoxides are generally solid at ambient temperature and only slightly soluble in alcohols. Therefore the reactivity of the alkoxide is reduced and the OR groups are difficult to hydrolyze.

There is a reduced tendency on the part of liquid alkoxides in which R is a more cumbersome alkyl radical, e.g. secondary butoxide to form molecular associations with stable alkoxy bridges, but their reactivity relative to water is low, because said reactivity decreases when the size of the alkyl group R increases. Therefore they are also only slightly reactive for hydrolysis.

According to the invention reactivity losses due to molecular associations by alkoxy bridges and the size of the alkyl group R are prevented by starting with an unpolymerized liquid alkoxide having a relatively cumbersome group R and by exchanging said group R by a lower alkyl group from the short chain anhydrous alcohol just prior to the reaction in order to obtain a good reactivity leading to the formation of beta LiAlO crystallized by hydrolysis followed solely by a drying operation. Moreover, through starting with a liquid alkoxide it is possible to have a high aluminium concentration in the solution.

In order to favour the exchange of alkyl groups without giving rise to molecular associations, preferably in stage a) preparation takes place of a solution of aluminium alkoxide and optionally silicon alkoxide in short chain anhydrous alcohol. Preferably working takes place under an inert atmosphere, e.g. nitrogen, in order to avoid the presence of water and the irreversible formation of oxo Al-O-Al bridges. Hydrated or unhydrated lithium hydroxide is rapidly added to this solution and mixing takes place under stirring.

Thus, by adding lithium hydroxide to the freshly prepared unpolymerized liquid aluminium alkoxide solution in a short chain alcohol, it is possible to avoid the formation of molecular associations by alkoxy bridges after exchange of the alkyl groups with those of the alcohol. Preferably, working takes place under an inert gas and e.g. nitrogen atmosphere in order to avoid the presence of water.

The hydrated or unhydrated lithium hydroxide can be added to the freshly prepared solution in the form of powder, solution or suspension in an alcohol. It is preferably added in the form of a suspension in the same short chain alcohol as that of the solution. Preference is given to the use of monohydrated lithium hydroxide.

The aluminium oxide usable in stage a) of the process according to the invention can e.g. be aluminium isopropoxide dissolved in secondary butanol or secondary butoxide of pure aluminium. Preference is given to the use of secondary aluminium butoxide. The silicon alkoxide can e.g. be tetraethoxysilane. The short chain alcohols used with these alkoxides are e.g. methanol, ethanol or propanol. Preference is given to the use of ethanol, which is less hydrophilic than methanol.

In stage a) of the present process, partial hydrolysis takes place with a temperature rise and this leads to a solution in which the lithium and aluminium are intimately mixed, optionally with silicon.

Starting with very pure products, it is possible in this way to obtain by subsequent hydrolysis a very homogeneous and very pure product, which by drying leads to a fine crystalline powder with a structure identical to that of the beta LiAlO$_2$ and which does not give rise to a significant weight loss during subsequent baking.

In addition, unlike in the case of the prior art processes, this powder can be directly transformed into sintered aluminium aluminosilicate or gamma lithium aluminate ceramic without it being necessary to carry out a prior calcination. Thus, the weight loss recorded during heating is very low, probably because the reactions are more complete starting with an unpolymerized, liquid aluminium alkoxide and lithium hydroxide in a short chain alcohol, which by exchange of said alkyl groups with alkoxide makes it possible to improve the reactivity of the alkoxide to hydrolysis.

The transformation of the crystalline powder with a structure identical to that of $\beta$-LiAlO$_2$ into $\gamma$-LiAlO$_2$ ceramic or lithium aluminosilicate and its sintering are then obtained by carrying out the shaping stage d) and heat treatment stage e) described hereinbefore.

During the heat treatment, the powder having a structure identical to that of beta LiAlO$_2$ is transformed into lithium aluminosilicate or gamma LiAlO$_2$ powder at about 600° to 700° C., followed by a sintering of the powder with the growth of grains at temperatures exceeding 800 to 1200° C.

The elimination of the prior powder calcination stage is of particular interest, because said stage is eliminated, whilst having a powder which is more reactive for sintering, so that the latter can be carried out at lower temperatures permitting a perfect control of the microstructure of the sintered ceramic.

Thus, with temperatures of 800° to 1200° C., it is possible to obtain ceramics whose density varies from 70 to 100% of the theoretical density with grains having a homogeneous size, whose average dimensions are 0.1 to 10 μm, as a function of the temperature used. Generally, sintering takes place in an oxygen atmosphere, e.g. in air.

Moreover, during sintering, the powder parts having a crystalline structure identical to that of beta lithium aluminate are embedded in a powder bed having the sane composition in order to provide a good stoichiometry control.

In the process according to the invention, there is a control of the characteristics of the powder (stoichiometry, crystallinity, particle size, etc.) and consequently its suitability for sintering, by regulating in an appropriate manner the molar ratio of the short chain alcohol to the aluminium alkoxide and the lithium hydroxide quantity. Advantageously, the alcohol:aluminium alkoxide molar ratio is 8 to 30 at the end of stage a).

The lithium hydroxide quantity generally corresponds to the stoichiometric quantity, but it is possible to regulate the density of the end product by using non-stoichiometric lithium hydroxide quantities in order to have a range extending e.g. up to 4 molar %.

There is also a control of the characteristics of the hydrolyzed product by adding in stage b) a water quantity such that the molar ratio of the water to the aluminium alkoxide is 5 to 20.

In stage a) of the process according to the invention, the alkoxide solution is prepared by mixing, under stirring, the said alkoxide or alkoxides with alcohol, followed by the immediate addition of lithium hydroxide and vigorous stirring takes place for an adequate time during which the temperature rises to approximately 80° C., in order to obtain an intimate mixture of the lithium and the aluminium.

Generally this time is between 20 and 60 minutes for a volume of 600 ml.

There is a partial hydrolysis in stage a), but the complete hydrolysis is then carried out in stage b) by adding water, accompanied by stirring. For said stage b) use is preferably made of deionized and decarbonated water in order to obtain a very pure powder by hydrolysis. Preferably stage a) is carried out under an atmosphere of inert gas, e.g. nitrogen, because alkoxides are very sensitive to moisture.

In stage c) the product obtained by hydrolysis is dried at a temperature below 300° C. This can e.g. take place at 150° C. in an oven or at a temperature above the critical point of ethanol in an autoclave, e.g. at 250° C. under 7 MPa.

In the process according to the invention, as has been shown hereinbefore, it is possible to simultaneously regulate the size of the grains and the density by choosing appropriate sintering conditions. It is also possible to adjust the density of the end product independently of the size of the grains, either by using a lithium hydroxide quantity such that it corresponds to a slight stoichiometry variation extending e.g. up to 4 molar %, based on the pure aluminosilicate or aluminate, or by adding to the starting solution at least one doping agent such as Na, K or Zn and a transition element. The doping agent can e.g. be added in hydroxide, nitrate or ethoxide form.

Other features and advantages of the invention will become more apparent from reading the following examples given in a purely illustrative and non-limitative manner.

EXAMPLE 1

In this example preparation takes place of a first aluminium butoxide solution by mixing under a dry nitrogen atmosphere 125 g of secondary aluminium butoxide $Al(OC_4H_9)_3$ obtained from Aldrich Chemical Company with an ethanol quantity such that the ethanol:butoxide molar ratio is 8, the solution being mixed for 10 min.

In another beaker, preparation takes place of a lithium hydroxide suspension by suspending 21.3 g of LiOH, $H_2O$ in an ethanol quantity such that the ethanol:lithium hydroxide molar ratio is 5.

The suspension is then added to the solution (the ethanol:aluminium alkoxide molar ratio then being 13) and vigorous stirring thereof is maintained for 30 min. during which the temperature rises to 80° C. This gives a white solution.

This is followed by the hydrolysis of the solution by adding deionized and decarbonated water in a quantity such that the water:aluminium butoxide molar ratio is 10 and in this way a viscous mixture is obtained, which is stirred for a further 10 min.

The white, pasty mixture is then dried in an oven at 150° C. for 2 h or in an autoclave at 250° C. and under a pressure of 7 MPa. Thus, a fine beta lithium aluminate powder is obtained. Analysis of this powder by X-ray diffraction shows that it is indeed beta lithium aluminate.

This powder undergoes cold isostatic pressing or moulding under a pressure of 200 MPa for 1 min. in order to form diameter 10 mm pellets. These pellets are then directly sintered in alumina crucibles at a temperature of 850° C., under air and for 2 h with a heating speed of 3° C./min., after embedding the pellets in a powder bed having the same composition in order to limit stoichiometry variations. X-ray diffraction analysis of the product obtained shows that it is gamma lithium aluminate.

After sintering, there is a longitudinal shrinkage of 18%, but no dilatometric anomaly is detected during beta/gamma transformation. After sintering at 850° C., the relative density is 70% and the microstructure corresponds to ultrafine particles of sizes below 0.1 μm.

EXAMPLE 2

The same operating procedure as in example 1 is used, but sintering is carried out at 1000° C. for 2 hours. In this case the density is 92% and the grain size is 0.2 to 0.3 μm.

EXAMPLE 3

The same operating procedure as in example 1 is used, but sintering takes place at 1100° C. for 2 hours. This leads to dense pellets with a density of 99% and a uniform microstructure with grain sizes of 2 to 3 μm.

EXAMPLE 4

The same operating procedure as in example 1 is used, but sintering takes place at 1150° C. for 2 hours. This leads to grain sizes of 3 to 8 μm.

Thus, the choice of a sintering temperature from 850° to 1150° C. makes it possible to adapt the grain sizes of the gamma lithium aluminate and obtain the desired dimensions in the range 0.1 to 10 μm, with a density which evolves between 70 and 100% of the theoretical density.

EXAMPLE 5

Preparation of $Li_{4.025}Al_{3.925}Si_{0.05}O_8$.

In this example the operating procedure of example 1 is followed, but to the secondary aluminium butoxide solution in ethanol is added a tetraethoxysilane solution in ethanol prior to adding the lithium hydroxide suspension.

The tetraethoxysilane solution is prepared in the following way. 1.46 ml of tetraethoxysilane is dissolved in an ethanol quantity such that the ethanol:silicon alkoxide molar ratio is 4, followed by the prehydrolysis of the alkoxide at a pH of approximately 2 for 1 hour.

This solution is then added to the freshly prepared solution of sec aluminium butoxide in ethanol and then the operations take place as in example 1.

By sintering at 1100° C., this gives a relative density of 95% and the microstructure obtained corresponds to grains with a size of 0.3 μm.

Thus, the process according to the invention is very interesting because it makes it possible to eliminate the prior calcination stage for transforming beta lithium aluminate into gamma lithium aluminate and easily regulate the microstructure and density of the product obtained.

We claim:

1. A method of covering controlled thermonuclear fusion reactors comprising the steps of preparing a lithium aluminosilicate of the formula $Li_{4+x}Al_{4-3x}Si_{2x}O_8$ with $0<x<0.28$ and depositing said lithium aluminosilicate as a covering material on said reactor.

2. The method of claim 1, wherein the step of preparing the lithium aluminosilicate comprises:

a) mixing a short chain anhydrous alcohol including a first alkyl group, a liquid, unpolymerized aluminum alkoxide including a second alkyl group, and, a silicon alkoxide, with a hydrated or unhydrated lithium hydroxide, and exchanging said first and second alkyl groups, b) adding water to the mixture obtained in stage a) in order to hydrolyze it, c) drying at a temperature below 300° C. the hydrolyzed product obtained in stage b) in order to evaporate the alcohols and water and obtain a crystalline powder, d) shaping the powder obtained in stage c) by isostatic or non-isostatic cold pressing, by pouring a slop, by spinning or by extruding and 24 e) subjecting the shaped powder to a thermal sintering treatment at a temperature of 800° to 1200° C. in order to obtain a sintered lithium aluminosilicate or gamma lithium aluminate ceramic.

3. Method according to claim 2, wherein step (a) is performed in a solution of aluminium alkoxide and optionally silicon alkoxide in the short chain anhydrous alcohol, to this solution is rapidly added hydrated or unhydrated lithium hydroxide and mixing takes place accompanied by stirring.

4. Method according to any one of the claims 2 or 3, wherein step (a) further includes the addition of at least one doping agent selected from the group consisting of Na, K and Zn as well as a transition element for the formation of the lithium aluminate or aluminosilicate doped by said agent.

5. Method according to claim 2, wherein the hydrated or unhydrated lithium hydroxide is added to the solution in the form of a powder, solution or suspension of lithium hydroxide in the same short chain anhydrous alcohol as that of the solution.

6. Method according to any one of the claims 3 and 5, wherein the aluminium alkoxide is secondary aluminium butoxide.

7. Method according to either of the claims 2 and 3, wherein the silicon alkoxide is tetraethoxysilane.

8. Method according to any one of the claims 2 or 3, wherein monohydrated lithium hydroxide is used in step a).

9. Method according to any one of the claims 2 or 3, wherein the short chain alcohol is ethanol.

10. Method according to claim 3, wherein the aluminium alkoxide and alcohol quantities of the solution are such that the alcohol:aluminium alkoxide molar ratio is 8 to 30.

11. Method according to claim 2, wherein the water quantity added in step b) is such that the water:aluminium alkoxide molar ratio is 5 to 20.

12. Method according to any one of the claims 2 or 3, wherein step (a) is performed under a nitrogen atmosphere.

13. Method according to claim 2, wherein the sintering heat treatment is carried out in an oxygen atmosphere.

14. A tritium-producing covering material for controlled thermonuclear fusion reactors comprising a lithium aluminosilicate of the formula:

$$Li_{4+x}Al_{4-3x}Si_{2x}O_8 \text{ with } 0<x<0.28.$$

15. The tritium producing covering material of claim 14, wherein said lithium aluminosilicate has a grain size of 0.1 to 10 micro meters.

16. The tritium producing covering material of claim 14, wherein said lithium aluminosilicate has a grain size of 0.3 micro meters.

17. The tritium producing covering material of claim 14, wherein said lithium aluminosilicate is further comprised of at least one doping agent selected from the group consisting of Na, K and Zn as well as a transition element.

18. The tritium producing covering material of claim 14, wherein said lithium aluminosilicate has a relative density of about 95%.

* * * * *

UNITED STATES PATENT AND TRADEMARK OFFICE
CERTIFICATE OF CORRECTION

PATENT NO. : 5,545,427
DATED : August 13, 1996
INVENTOR(S) : Jean-Pierre Boilot et al.

It is certified that error appears in the above-indentified patent and that said Letters Patent is hereby corrected as shown below:

Column 4, line 42, delete "sane" and insert --same--.

Column 7, line 6, delete "24".

Column 7, line 6, " e) " should be the start of a new paragraph.

Column 7, line 22 (claim 5, line 1), delete "claim 2" and insert --claim 3--.

Column 7, line 27 (claim 6, line 1) delete "claims 3 and 5" and insert --claims 2, 3 and 5--.

Column 8, line 22, (claim 16, line 1) delete "claim 14" and insert --claim 15--.

Signed and Sealed this

Twelfth Day of November, 1996

Attest:

BRUCE LEHMAN

*Attesting Officer*　　　　*Commissioner of Patents and Trademarks*